United States Patent [19]

Severinsky

[11] Patent Number: 5,313,358
[45] Date of Patent: May 17, 1994

[54] MULTIPHASE COMMON MODE TRANSIENT SUPPRESSOR

[75] Inventor: Alex J. Severinsky, Silver Spring, Md.

[73] Assignee: Premier Power, Inc., McLean, Va.

[21] Appl. No.: 806,284

[22] Filed: Dec. 13, 1991

[51] Int. Cl.$^5$ ............................................... H02H 3/20
[52] U.S. Cl. ..................................... 361/118; 361/56; 361/111
[58] Field of Search .................. 361/56, 118, 91, 111, 361/86; 333/181

[56] References Cited

U.S. PATENT DOCUMENTS

| | | | |
|---|---|---|---|
| 4,342,013 | 7/1982 | Kallman | 333/181 |
| 4,901,183 | 2/1990 | Lee | 361/56 |
| 5,091,817 | 2/1992 | Alley et al. | 361/56 |

*Primary Examiner*—A. D. Pellinen
*Assistant Examiner*—S. Jackson
*Attorney, Agent, or Firm*—Banner, Birch, McKie & Beckett

[57] ABSTRACT

A multiphase common mode transient suppressor is disclosed which uses a plug choke placed at the utility power service input to the circuit of the present invention. The plug choke contains, for example, three coils corresponding to three power carrying input conductors. Each coil is wound in the same direction, and has the same number of turns. Preferably, a magnetic core is provided around which the coils are wound. At the output of the plug choke are placed three capacitors, in parallel between a grounding conductor and three output conductors. The choke in combination with the capacitors creates a resonant circuit.

A control circuit is provided which is connected to the plug choke via a catcher coil. The catcher coil "catches" the flux induced by the transient and dissipates its energy through a resistor, thus dampening the resonant circuit. Current through the resistor is controlled by a semiconductor switch. The semiconductor switch in turn is controlled by a control circuit comprising, preferably, a voltage conditioner, a comparator, an edge detector and a pulse generator. Additionally, a diode bridge is placed between the catcher coil and the resistor to ensure that current through the resistor and the semiconductor switch is always in the same direction.

11 Claims, 3 Drawing Sheets

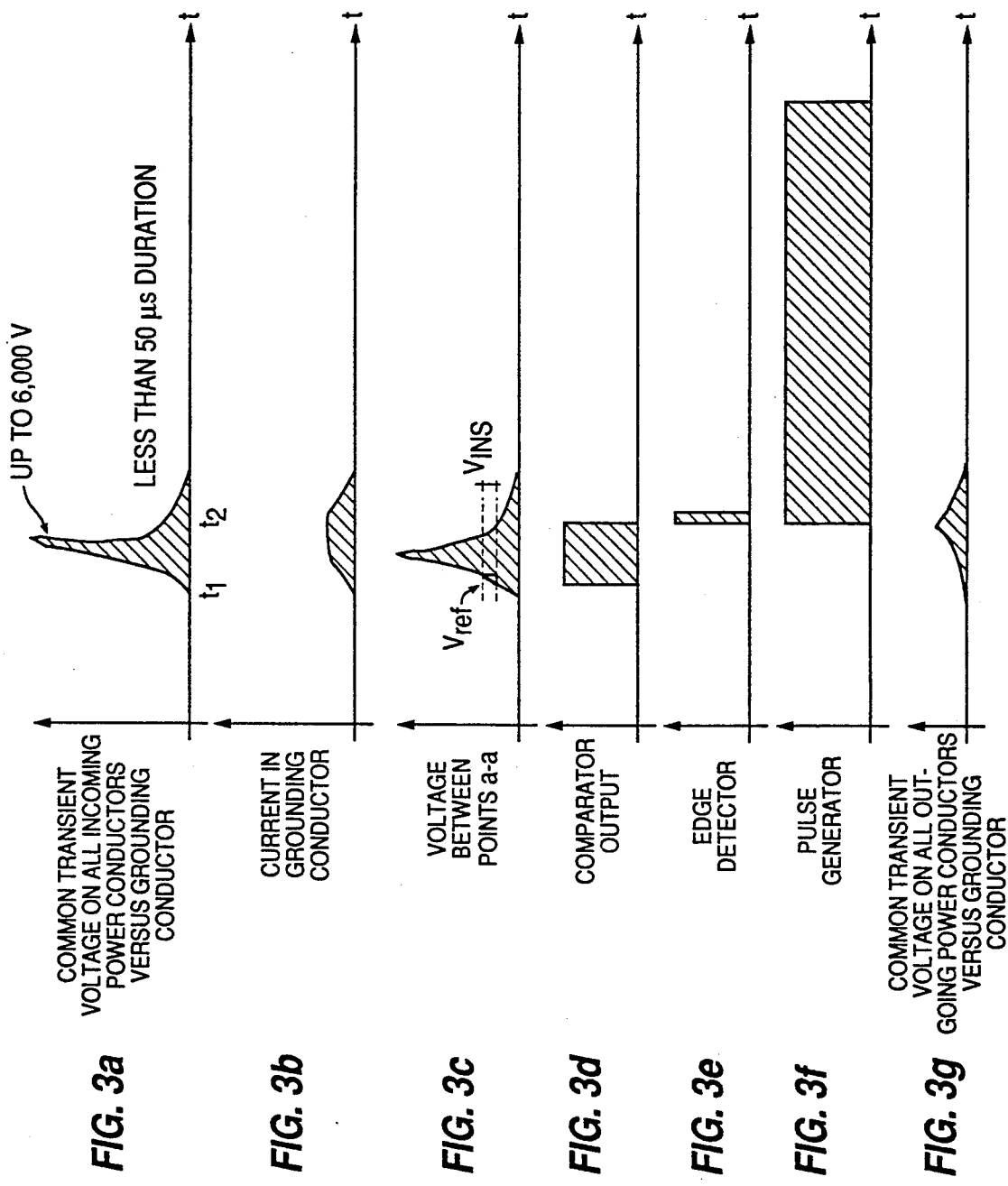

MULTIPHASE COMMON MODE TRANSIENT SUPPRESSOR

BACKGROUND OF THE INVENTION

This invention relates to the field of protecting electrical loads from transients which induce large voltages common between electrical power carrying conductors and a grounding conductor.

SUMMARY OF THE INVENTION

The main application of transient suppressors is to suppress lightning induced transients. IEEE Std. 587 describes the nature and parameters of those transients. They exist between all power carrying conductors and the grounding conductor. The reason for this is that all power carrying conductors are well insulated from a grounding conductor, i.e. impedance between those conductors and a grounding conductor is high. Therefore, voltage transients common to all power conductors versus grounding conductors are not well shunted. To the contrary, electrical loads and especially capacitors in rectifier filters create small impedance between the power carrying conductors and therefore differential transients between power conductors are well shunted by existing loads.

According to the same IEEE Std. 587, the amplitude of common voltage transients can reach 6,000 V inside buildings, and transient current in all conductors including a grounding conductor can be as high as 3,000 A. The duration of those transients is small, less than 50–100 microseconds.

These transients create two problems. First, high voltage can damage insulation in electrical loads and cause an electrical failure. In sensitive electronic loads like computers, voltage transients can propagate through parasitic paths to logic circuits and cause data processing failures. Typical threshold sensitivity is above 100 V. Second, high current in a grounding conductor can travel through grounding shields of data cables and induce interruption of communications and equipment failure in low voltage and current logic circuits.

There are numerous common mode transient suppressors known in the art. One of the best representatives of those is described in U.S. Pat. No. 4,901,183 issued on Feb. 13, 1990 to Lee. Lee discloses only a single phase suppressor but its principals can be applied to make a multiphase suppressor. First, Lee does not suppress transient current in a grounding conductor. Current is diverted from power conductors into a grounding conductor via MOV transient absorption devices M1-M3. Voltage transients are suppressed by MOV devices M1-M3 to voltage peak levels of approximately double the peak of the nominal voltage in the electrical service. For example, the voltage peak will be 350-400 V for a 120 VRMS (170 V peak) electrical service.

Chokes L1 and L2 in Lee create an impedance for the load current and cause severe voltage sags when electrical loads are turned on or off. During this switching, 7-20 times more power is required for load starting, and because of the impedances created by chokes L1 and L2, current rise to the load is limited. Limited current rise to the load causes the output voltage delivered to the load to collapse.

Lee's additional silicon transient suppressors placed after the chokes have a clamping threshold above 200 V (column 5, line 59) and therefore cannot limit an output voltage to the level suitable for computer loads (e.g., 100 V).

Another problem with Lee is that MOV transient suppressors have a limited life and will fail over time. To protect the device from catastrophic failure, Lee utilizes fuses in each power conductor which increases cost and reduces ease of use.

PURPOSE OF THIS INVENTION

A purpose of this invention is to overcome the problems of the prior art and to create a common mode transient suppressor for both voltage and current which is suitable for computer equipment and does not use components which have a limited life. A further purpose of this invention is to create a multiphase suppressor which can be employed with any number of power carrying conductors (e.g., two, three, or four).

The present invention achieves the following benefits:

a) Transient current suppression not currently provided by existing MOV voltage transient suppressors;

b) Transient voltage suppression to levels safely tolerated by sensitive computer loads, 1–2 orders of magnitude more in suppression over usual MOV transient suppressors;

c) Practically unlimited operating life in comparison with existing MOV transient suppressors.

The above summary of the present invention provides only a broad overview of a preferred embodiment within the present invention. The details of specific aspects of the present invention will be more fully understood from the following descriptions and drawings.

BRIEF DESCRIPTION OF THE DRAWINGS

FIGS. 3a-3g shows voltage diagrams for the present invention.

DETAILED DESCRIPTION OF THE PREFERRED EMBODIMENTS

Figure 1:
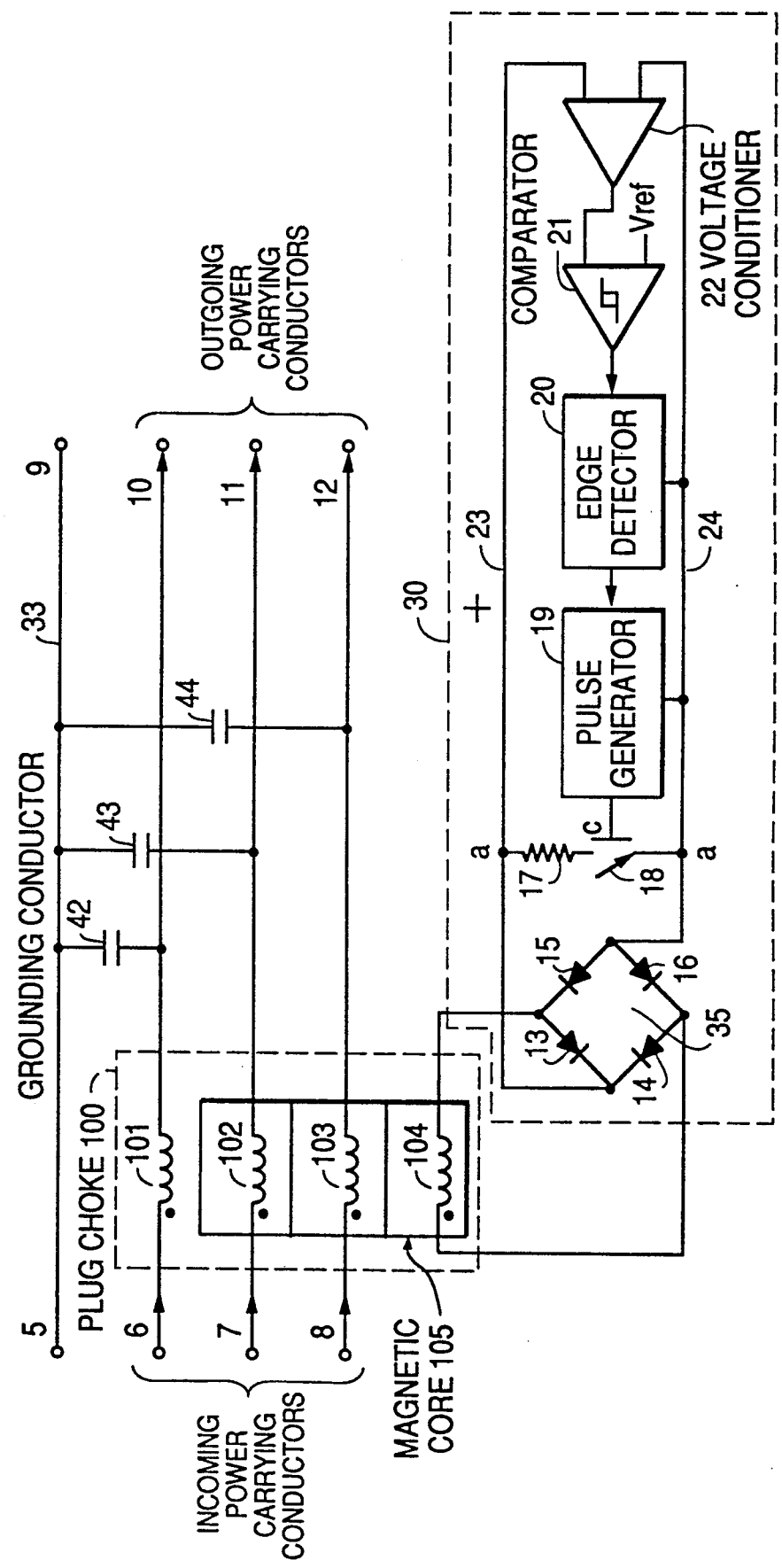
FIG. 1 shows a multiphase common mode transient suppressor according to the present invention.

Suppressor Circuit Description: FIG. 1

An electrical circuit for the preferred embodiment of the present invention is shown in FIG. 1. The example shown in FIG. 1 uses a three AC power carrying conductor service but it can be easily expanded to four or contracted to two.

Incoming power is input onto terminals 6, 7, and 8 and the incoming grounding conductor is input onto terminal 5. Output load power conductors are connected to terminals 10, 11, and 12. Load grounding conductor is connected to terminal 9.

Inside the suppressor of the present invention, grounding terminals 5 and 9 are connected with a grounding connector 33. Output terminals 10–12 are connected to power carrying terminals on the incoming line side via coil windings located in Plug Choke 100. Incoming terminals 6, 7 and 8 are connected to output terminals 10, 11 and 12 via coils 101, 102 and 103, respectively. The beginnings of coils 101–103 are marked by a dot in FIG. 1, and are shown connected to incoming power terminals 6–8. However, all of the beginnings of coils 101–103 may also be connected to outgoing power terminals. The beginning of a coil is defined as the coil wire side which is used in production to begin winding. All coils 101-103 are wound in one direction, clockwise or counterclockwise.

Figure 2:
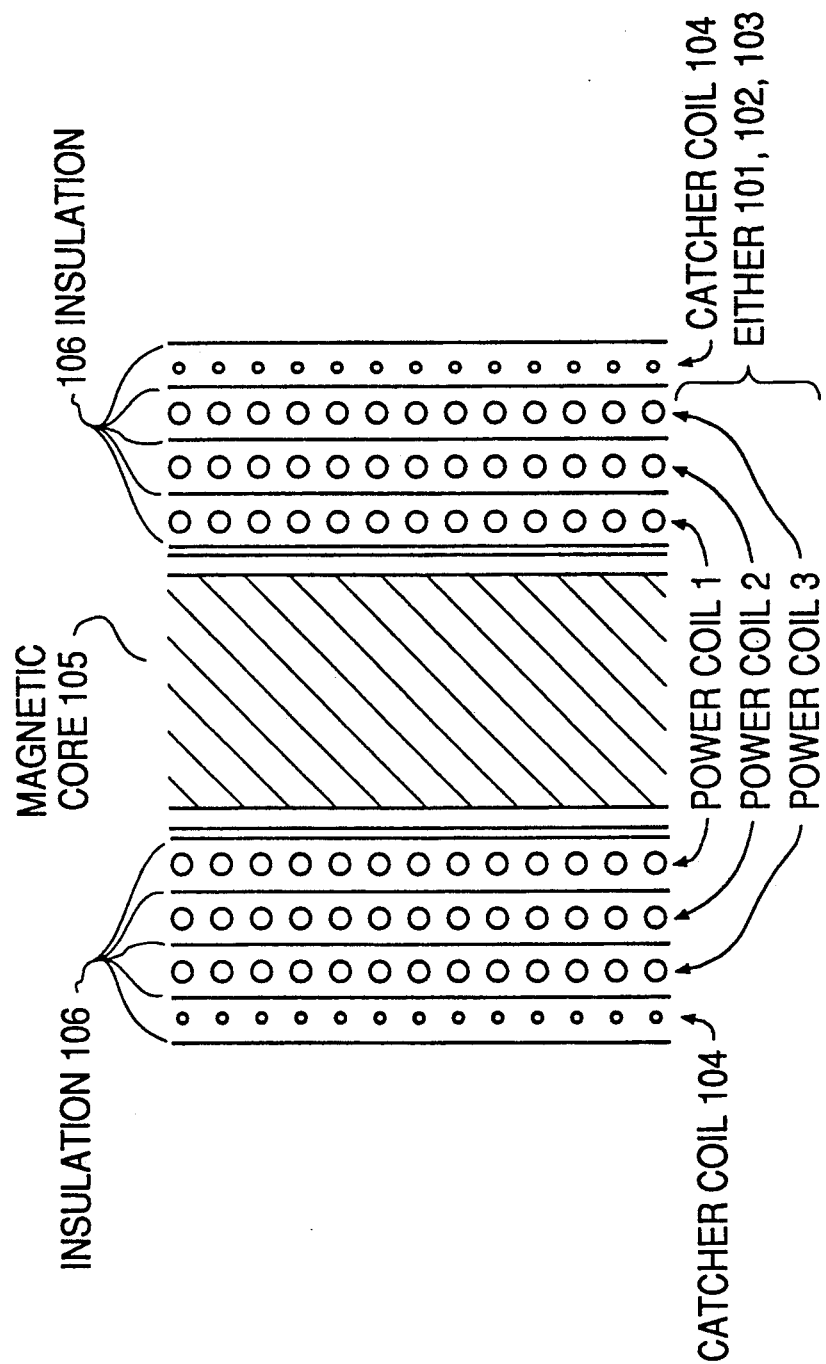
FIG. 2 shows a plug choke construction according to the present invention.

All coils 101-103 are located on the same magnetic core 105 as shown in FIG. 2.

Each outgoing power terminal is connected to grounding terminals 5 and 9 via capacitors 42, 43, and 44.

In addition to coils 101-103, there is one more coil on the same core 105—catcher coil 104. The terminals of coil 104 are connected to the input line side of a full wave rectifier bridge 35 formed by diodes 13-16. Output from rectifier bridge 35 is connected to conductors 23 and 24 in such a way that positive voltage will exist on conductor 23, with negative voltage on conductor 24.

Connected in series across conductors 23 and 24 is a circuit consisting of resistor 17 and a controllable semiconductor switch 18. Current flows in semiconductor 18 from conductor 23 to conductor 24. Many different semiconductors can be used as switch 18 like MOSFETs, IGBTs, Bipolar Transistors, Darlingtons, MOS controlled thyristors, GTOs, etc., as is well known. A control signal is applied between control terminal C of semiconductor 18 and conductor 24.

Conductors 23 and 24 are also connected to an input of a voltage conditioner 22. Conditioner 22 attenuates the voltage to a level suitable for common logic circuit operation. There are numerous known conditioners performing this function. The simplest one is a resistor divider, however, other conditions are well known in the art.

Output of voltage conditioner 22 is fed to the input of a voltage comparator 21. The other input of comparator 21 is connected to a reference voltage Vref. Comparator 21 has hysteresis further explained below. There are numerous well known comparators with hysteresis.

Output of comparator 21 is fed into logic edge detector 20. There are numerous well known edge detectors in the art. The purpose of edge detector 20 is explained below.

The output of edge detector 20 feeds an input of a monostable pulse generator 19 and an output of generator 19 feeds control terminal C of switch 18. There are numerous well known pulse generator circuits. Again, the purpose of pulse generator 14 is explained below.

Plug Choke Construction: FIG. 2

FIG. 2 shows a general outline for construction of plug choke 100. In the middle of choke 100 is a magnetic core 105. Many different materials with magnetic properties can be used depending upon the specific application. In most cases, tape wound cores will suffice with magnetic materials similar in characteristics permalloy.

Between core 105 and between each coil 1-3 are layers of insulation 106 which electrically isolate each coil from all others and core 105. Various types of insulation may be employed, as is known by those skilled in the art. Power coils 1-3 are wound first around core 105 all with identical winding directions. Additionally, the number of turns in each coil must be the same. The number of power coils should be equal to the number of power carrying conductors in the electrical service: typically 2, 3, or 4.

Catcher coil 104 is an outer winding covering power coils 1-3. The direction of winding, number of turns, and wire gage for coil 104 is irrelevant compared to power coils 1-3.

DESCRIPTION OF OPERATION

Plug Choke Operation

All three power coils 101-103 are wound around the same magnetic core 105, in the same direction and have the same number of turns in the preferred embodiment. Magnetic flux in the core is:

$$FLUX = k * N * (I_{101} + I_{102} + I_{103});$$

where: N—Number of turns;
$I_{101}$—Current in coil 101;
$I_{102}$—Current in coil 102;
$I_{103}$—Current in coil 103;
k—magnetic coefficient.

The sum of current in coils 1-3 generated by the electrical service is zero because each phase of electrical service produces two currents through the coils: one going into coils 1-3 and the other one coming out of coils 101-103, both having equal current values. Therefore, flux produced by the current delivered from the electrical service is zero. With zero flux, the magnetic impedance is also zero and therefore plug choke 100 does not create obstruction to current flow from the electrical service.

Power Circuit operation

When electrical service voltages are applied to incoming power terminals 6-8, the same voltages appear on outgoing power terminals 10-12. Because choke 100 does not obstruct current flow from the input to the output, the voltages on output terminals 10-12 remain the same as on input terminals 6-8 regardless of the load.

The same electrical service voltages applied across capacitors 42-44 will direct some electrical current to grounding conductor 33 through capacitors 42-44. By selecting the value of capacitance, this current can be made to be equal to any predefined value, usually dictated by so called "Leakage" current limitations of applicable safety standards. For example, 5% of rated current.

When a common voltage is applied to all incoming power terminals 6-8 compared to grounding terminal 5, then current starts flowing in one direction through coils 101-103 and capacitors 42-44. Because current is going in one direction through coils 1-3, magnetic flux appears in core 105 in accordance with the above formula. Appearance of flux indicates that now Plug Choke 100 creates an impedance to current flow, or plugs the incoming terminals in regards to the common voltage. This is why it is called a "Plug Choke".

Referring to FIG. 3, an example of a transient voltage generated by lightning which can appear as common voltage on terminals 6-8 is shown; see FIG. 3a. FIG. 3b shows the current which will be induced by this transient from time t1 to time t2. Each coil of Plug Choke 100 forms a resonant circuit together with its respective capacitors 42-44. The resonant period of this combined oscillator is selected to be high in comparison with the transient voltage duration, and therefore the rate of current rise during the entire duration of the transient is defined by the impedance of Plug Choke 100. By selecting a high permeability magnetic core 105 and making coils 101-103 with a large number of turns, it is possible to make this impedance so high that the value of current in grounding conductor 33 during the transient can be made to be below any predefined value, like 100 A or 0.1 A.

This value of current is in sharp contrast with current diverted into a grounding conductor by the prior art's use of a MOV transient suppressor, which is equal to the total value of lightning induced current; e.g., 3,000 A. Plug choke 100 of the present invention eliminates the effect of current transients in the connected load.

Any residual current coming through choke 100 creates on capacitors 42–44 a voltage common on all power carrying conductors to ground, as shown in FIG. 3g. By selecting the value of capacitance of those capacitors 42–44 for a given current, it is possible to make this voltage lower than any predefined value like 100 V, or 10 V, or less.

Thus, a significant reduction of the voltage transient is achieved from a transient of 6,000 V to any value, but usually around 10–30 V. it is much better reduction that one offered by MOV suppressors, which provide reductions from 6,000 V to 400 V. And the present invention does not contain any components having a limited life.

Control Circuit

Although one embodiment of a control circuit is described in detail below, many similar circuits may be constructed by those skilled in the art to achieve the same desired results. Without control circuit 30, at the end of the transient, choke 100 and capacitors 42–44 will discharge in an oscillatory manner at a resonant frequency, usually 1–3 kHz. This will cause voltage on capacitors 42–44 to be twice as large as at the end of the transient. This fact is well known in general electrical circuit theory. The duration of decay will be determined mainly by magnetic losses in choke 100. Because those losses are low, the duration of this oscillatory decay can be long, like 0.1 sec.

Control circuit 30 performs two functions. First, it eliminates doubling of the voltage on capacitors 42–44 from the transient, thereby allowing use of half as large of a choke 100. Second, circuit 30 increases the rate of oscillatory decay.

Referring again to FIG. 2, the flux generated in magnetic core 105 during a common mode transient can be discharged through catcher coil 104. Coil 104 "catches" this flux, and the energy in oscillator components 101–103 and 42–44 is dissipated not in core 105 but through circuit 30.

Voltage induced in coil 104 is proportional to the transient voltage, because Plug Choke 100 acts as a transformer in regards to coil 104; see FIG. 3c. The turns ratio between coil 104 and power coils 1–3 can be selected for proper operation of control circuit 30 but preferably it will be below 500 V during a 6,000 V transient.

The voltage on coil 104 can be of any polarity because the transient may be of any polarity. Therefore, the voltage is rectified by rectifier bridge 35 with diodes 13–16. Thus, the transient voltage between points a—a in FIG. 1 is unipolar, positive on conductor 23 and negative on conductor 24.

This transient voltage is divided by voltage conditioner 22 to the level of logic voltage, typically in the range of 10–15 V. Then, the voltage is applied to comparator 21 with the reference voltage (Vref) set low (e.g., 1 V) so that comparator 21 changes its output logic level at the beginning of a transient pulse; FIG. 3d.

Comparator 21 is a hysteresis comparator because it internally changes its threshold so that when the pulse decays, comparator 21 will change its output logic state at a lower transient pulse voltage value (see Vhys in FIGS. 3c–3d). This lets choke 100 restrict the transient current during most of the transient time.

Output of comparator 21 is fed into edge detector 20 which detects the edge related to the end of the transient; see FIG. 3e. In this case, detector 20 detects the falling edge, but circuit 30 could be designed so that detector 20 detects the rising edge by using inverted logic. When edge detector 20 detects the falling edge of the signal output by comparator 21, edge detector 20 outputs a signal to pulse generator 19.

In response to this signal from edge detector 20, pulse generator 19 generates a pulse having a duration long enough to discharge energy from oscillator components 101–103 and 42–44; see FIG. 3f. Usually, this pulse duration will be 0.5 to 2 milliseconds; see FIG. 3f. The duration of the pulse generated by pulse generator 19 is predetermined.

The pulse of FIG. 3f turns on semiconductor switch 18 which connects resistor 17 across coil 104. The value of resistor 17 determines the speed of discharge of the oscillator components. Consequently, the common transient voltage appearing on all outgoing power conductors compared with the grounding conductor is greatly attenuated as shown in FIG. 3g. At the end of the pulse, semiconductor 18 disconnects resistor 17 and the whole suppressor is ready again for the next transient.

Any references above to U.S. patents should be deemed to incorporate by reference any subject matter disclosed therein considered essential to one of ordinary skill in the art to manufacture, use or sell the present invention. Many changes and modifications in the above embodiment of the invention can, of course, be made without departing from the scope of the invention. Consequently, the scope is intended to be limited only by the following claims.

I claim:

1. A multiphase common mode transient suppressor comprising:

a plurality of input terminals for receiving incoming electrical power, said input terminals corresponding to a plurality of input power conductors;

a plurality of corresponding power output terminals for providing outgoing electrical power, said output terminals corresponding to a plurality of output conductors;

an input ground terminal for connection to an input ground conductor and an output ground terminal for connection to an output ground conductor, said input and output ground terminals being connected together;

current storage means coupled between said input terminals and said output terminals for storing current from said incoming power, said current storage means being formed of a core and a plurality of electrical coils wound around said core, each of said coils having a beginning end and an ending end, each of said input terminals and their respective said corresponding output terminals being connected to said beginning and said ending end respectively of a respective said coil;

electrical charge storage means for storing an electrical charge, said charge storage means being coupled between respective ones of said plurality of output terminals and said output ground terminal;

catcher coil means formed of an electrical coil wound around said core for dampening oscillations produced by said current storage means and said charge storage means; and control means coupled to said catcher coil means for controlling the operating of said catcher coil.

2. The multiphase common mode transient suppressor of claim 1 wherein said control means includes shorting means for electrically shorting said catcher coil in order to dampen said oscillators, the operation of said shorting means being in response to a power transient pulse received by said input terminals.

3. The multiphase common mode transient suppressor of claim 2 wherein said shorting means includes a resistive element and a semiconductor switch serially connected across said catcher coil, the operation of said semiconductor switch being controlled to short said catcher coil for a predetermined period of time upon the occurrence of said power transient pulse.

4. The multiphase common mode transient suppressor of claim 3 wherein said predetermined period of time commences upon the falling edge of said power transient pulse.

5. The multiphase common mode transient suppressor of claim 3 wherein said control means further includes voltage rectifying means for rectifying said power transient pulse across said catcher coil to provide a unipolar voltage, said unipolar voltage being applied across said semiconductor switch and a resistive element.

6. The multiphase common mode transient suppressor of claim 5 wherein said control means further includes voltage conditioning means coupled to said rectifying means for conditioning said unipolar voltage to reduce its amplitude to the level commonly used by integrated circuits.

7. The multiphase common mode transient suppressor of claim 6 wherein said control means further includes comparator means coupled to said voltage conditioning means and to a reference voltage generator for comparing said corresponding voltage to a reference voltage from said reference voltage generator, said comparator means providing a first logic level output when said corresponding voltage is within a first predetermined range of said reference voltage and providing a second logic level output when said corresponding voltage is within a second predetermined range of said reference voltage, said first and second logic levels being used to control the operation of said semiconductor switch.

8. The multiphase common mode transient suppressor of claim 7 wherein said control means further includes edge detector means coupled to said comparator means for providing an edge detection output signal upon the presence of said second logic level output signal, said edge detection output signal being used to control the operation of said semiconductor switch.

9. The multiphase common mode transient suppressor of claim 8 wherein said control means further includes pulse generation means coupled to said edge detection means for providing an output pulse of said predetermined period of time in accordance with the presence of said edge detection output signal, said output pulse being used to control the operation of said semiconductor switch.

10. The multiphase common mode transient suppressor of claim 1 wherein said coils are all wound in the same direction around said core.

11. The multiphase common mode transient suppressor of claim 10 wherein said coils contain the same number of turns.

* * * * *